Patented Jan. 21, 1941

2,229,130

UNITED STATES PATENT OFFICE 2,229,130

PROCESS FOR MAKING LUMINESCENT ZINC PIGMENTS

Aniello Augustus Romano, Elmhurst, Del., assignor to E. I. du Pont de Nemours & Company, Wilmington, Del., a corporation of Delaware No Drawing. Application May 13, 1939, Serial No. 273,517

5 Claims. (Cl. 250—81)

This invention relates to the preparation of luminescent zinc compounds and more particularly to the production of luminescent zinc sulfide pigments possessing uniform fine particle size and having a high degree of luminescence of excellent brightness and relatively long duration.

Preparations containing zinc sulfide and possessing the property of luminescence, particularly phosphorescence, have been known to those versed in the art. By phosphorescence, I refer to the phenomenon of emitting light for some time following the cessation of an exposure to radiant energy. Previous to my discovery it was the general belief that the degree of luminescence of zinc sulfide was directly proportional to the size of the particle. Hence, preparations showing good luminescence have heretofore been relatively coarse and unsuited for use as a pigment.

The presence during calcination of some heavy metal compound, known as an activator, and a salt, which acts as a flux, while not absolutely essential to the production of luminescent zinc compounds, has long been recognized as helpful. It has further been known that certain precautions regarding the maintenance of purity in the production of luminescent zinc compounds are necessary. Aside from the avoidance of contamination, no preferred method of preparing the zinc compound has been practiced by the art. It has usually sufficed to choose a suitably pure zinc compound and treat it according to certain specifications in order to give it luminescent properties. Since the luminescent products have generally been coarse, many have tried to reduce the particle size by grinding in order to make said product suitable for pigment use. In each instance, however, such grinding has reduced the luminescence to a large extent.

This invention has as an object the production of zinc compounds possessing luminescent properties of excellent brightness and unusual durability. A further object is to prepare, without resorting to grinding, zinc compounds possessing good pigment properties as well as luminescent properties. A still further object is to produce a luminescent zinc compound the particles of which are easily dispersed, i. e., having practically no tendency to form lumps or aggregates. Additional objects will become apparent from an examination of the following description and claims.

These objects are attained according to the herein described invention which broadly comprises taking a zinc compound which has been precipitated from an acidic solution and calcining it in the presence of a compound of copper.

In a more restricted sense this invention comprises taking an acidic solution containing between about 1/6 and about 2/3 of a mol of zinc per liter and containing about 1 part, calculated as copper, of a compound of copper for about each 30,000 to about each 8,000 parts of zinc and precipitating zinc sulfide therefrom. To the resulting zinc sulfide pulp is added between about 0.06% and about 5%, calculated as chlorine and based on the zinc sulfide, of a member selected from the class consisting of ammonium chloride and zinc chloride. The resulting product is then calcined at a temperature between about 800° C. and about 1200° C.

The preferred embodiment of my invention comprises taking an acidic solution containing between about 1/4 and about 1/2 of a mol of zinc per liter and containing about 1 part, calculated as copper, of copper chloride for about each 20,000 to about each 10,000 parts of zinc and precipitating zinc sulfide therefrom with hydrogen sulfide. The precipitated zinc sulfide is then filtered and washed to remove most of the acid. The remaining acid can then be adjusted to a pH between about 4.5 and about 7, for example, with ammonium hydroxide. To this zinc sulfide pulp is then added between about 0.6% and about 2%, calculated as chlorine and based upon the zinc sulfide, of a member selected from the class consisting of ammonium chloride and zinc chloride, preferably ammonium chloride. The resulting solids are then calcined at a temperature between about 1000° C. and about 1100° C., care being taken during said calcination not to introduce any impurities which would be detrimental to the finished product. After cooling, such as by drying or by quenching in water, a product is produced which is suitable for pigment use.

This invention may be more readily understood from an examination of the following examples which are given for illustrative purposes and are not intended to place any restrictions or limitations on the herein described invention.

Example I

A solution of zinc sulfate of good purity was diluted with tap water until its concentration was equivalent to 18 grams of zinc per liter. Purified hydrogen sulfide gas was then passed into the solution until it was practically saturated. After settling, the supernatant liquor was clear and contained 3.38 grams of Zn per liter and 20.8 grams of $H_2SO_4$ per liter, corresponding to a yield of approximately 81%. The settled zinc sulfide was filtered and washed until the acid in the washing was reduced to 0.5 gram per liter. The washed filter cake was then repulped in water and ammonium hydroxide was added to neutralize most of the acid. The partly neutralized slurry was distinctly acidic as shown by indicators. A solution of ammonium chloride was then admixed with the slurry. A copper sulfate solution containing 1 part of Cu for every 12,000 parts of Zn, present as ZnS, was also added and mixed. After filtering it was estimated that the amount of ammonium chloride remaining in the cake corresponded to between about 1 to about 2% of the ZnS. The cake was then dried and calcined at about 1000° C. The calcined pigment was allowed to cool in air. This product was easily reduced, by shaking on a screen or immersing in water, to a fine powder. Microscopic examination showed rather uniform particles of an average diameter of 8 microns.

*Example II*

A solution of zinc chloride was prepared by dissolving pure zinc oxide in C. P. hydrochloric acid. The resulting solution was slightly acidic and was diluted to a concentration equivalent to about 15 grams of Zn per liter. After saturating with hydrogen sulfide and settling the solids, the mother liquor contained 3.52 grams of Zn per liter and 11.3 grams of HCl per liter which corresponded to a yield of about 73%. The solids were then filtered and washed until the washings contained 0.7 gram of HCl per liter. The filter cake was then repulped, nearly neutralized with ammonium hydroxide, and a dilute solution of copper sulfate was added in a quantity such that about 1 part of Cu was present for every 15,000 parts of Zn, present as ZnS. After filtering and drying the solids were calcined for one hour at 1100° C. The pigment was cooled in air and the product consisted of small particles, 95% of which readily passed through a 200 mesh screen on shaking. The average particle size of this product was about 15 microns.

The products of Examples I and II when compared with a prior art sample of zinc sulfide showed a much brighter luminescence of longer duration as well as much finer particle size. Because of the smaller particle size, the properties such as tinting strength, obscuring power, texture, etc., were such that the new product was very useful as a pigment.

The following table shows the relative properties of the prior art luminescent zinc sulfide, samples prepared by my new process, and the usual pigment grade non-luminescent zinc sulfide:

and 2 minute intervals after extinguishing the light. While the above table shows the luminescence up to 2 minutes the visible luminescence lasted much longer.

The non-acid precipitation sample of zinc sulfide was prepared in the same manner as in Example II. This example shows the importance of acidic precipitation.

The products produced by my herein described process have a uniform particle size which is very pronounced when compared with prior art luminescent pigments.

It is to be understood that the herein specific embodiments of this invention may be subjected to variation and modification without departing from the scope thereof. For example, although I prefer to employ copper chloride my process is not limited thereto since the use of any soluble salt of copper is within the scope of this invention. Further, while I prefer to employ about 1 part of copper for about each 10,000 to about 20,000 parts of zinc, it is to be understood that amounts outside of this range may be advantageously employed. Thus, I may use as high as about 1 part of copper for about each 5,000 parts of zinc or I may use as low as about 1 part of copper for each 50,000 parts of zinc. Amounts greater than about 1 part of copper for each 5,000 parts of zinc or lower than about 1 part of copper for each 50,000 parts of zinc are not recommended since there is a sacrifice in the luminescent quality of the pigment. Still further, although I prefer to add the copper compound prior to the precipitation step it is to be understood that it may advantageously be added at any time prior to said precipitation up to the calcination step.

In the precipitation of the zinc sulfide I prefer to employ dilute solutions of zinc, for example, solutions containing less than 30 grams of zinc per liter. I have found that by using dilute solutions of zinc the product filters with relative ease. However, improved results are obtained by employing as little as $\frac{1}{10}$ of a mol or as high as 1 mol of zinc per liter.

The amount of ammonium chloride or zinc chloride which is employed will depend upon the original zinc salt used. Thus, if the sulfide is precipitated from a zinc chloride solution, sufficient chloride may be left in the pulp when the acidity is adjusted and no further addition is necessary. With other zinc salts such as the sulfates, acetates, etc., I have found it desirable in almost every instance to add more of the chloride. As a general rule, I have found it desirable to have between about .06% and about 5%, preferably between about 0.6% and about 2%, calculated as chlorine, and based upon the

| Sample | Luminescence | | Part. size aver. | Tinting strength | Texture of paint film | Tendency to aggregate |
|---|---|---|---|---|---|---|
| | 1 min. | 2 min. | | | | |
| Prior art luminescent zinc sulfide | 100 | 100 | Microns 40 | 20 | Pebbly | |
| Product of Ex. I | 120 | 130 | 8 | 50 | Smooth | Free soft lumps. |
| Product of Ex. II | 130 | 140 | 15 | 40 | ...do | Free flowing. |
| Non-acid precipitation | 90 | 90 | 20 | | Gritty with lumps | Lumps requiring mechanical disintegration. |
| Pigment grade | | | | 160 | Very smooth | Soft powder. |

Luminescence was determined in the same way for all the above samples. The method essentially consisted of a standard exposure of the various samples in clear glass containers to a 100 watt bulb. The relative brightness of each was determined photoelectrometrically at 1 minute weight of the zinc sulfide, of said salts present. Further, while I prefer to add the salt to the zinc sulfide pulp after the adjustment of the acidity, it is to be understood that good results are obtained by the addition either prior to the precipitation step or prior to the calcination step.

Also, it may be generated in the reacting mixture.

The herein disclosed invention may be carried out in any well-known calcining apparatus. However, because of the excellent results obtained, I prefer to calcine in loosely stoppered silica tubes.

Although this description has concerned principally the preparation of luminescent zinc sulfide itself my process includes its preparation in admixture with other pigments such as titanium dioxide, and the like, or extenders such as barium sulfate, calcium sulfate, asbestine, silica, and the like.

The acid concentration increases during precipitation by my preferred method due to the liberation of strong acid. The final concentration of this acid effects the yield obtained from the reaction, i. e., if a high acid concentration results the yield will be lower. Therefore, I prefer to precipitate the zinc compound from relatively dilute solutions so as to obtain good yields. However, it is to be understood that my invention is not limited to the use of dilute ranges.

Low yields due to large quantities of zinc in the mother liquor are not necessarily harmful because, for instance, the mother liquor containing zinc salts and free acid can be returned to the process at the point where zinc is being put into solution thereby reducing zinc losses to a minimum and giving an excellent over-all yield.

Another means of increasing the yield by my process is to neutralize part of the liberated acid as the precipitation reaction proceeds. A good reagent for this neutralization is ammonium hydroxide since it serves the double purpose of increasing the yield and generating ammonium chloride in the system which otherwise may have to be added later.

In order to obtain the improved results enumerated herein it is essential that the zinc sulfide be precipitated from an acidic solution.

The usefulness of my process is apparent from the fact that by its application a pigment can be made which not only has excellent luminescent properties but also has good pigment properties, such a combination of properties being heretofore unknown in products of this type. Since my product is of good pigment quality, its usefulness is found in the preparation of paints and other coating materials where both luminescence and good pigment properties are desired. Furthermore, paints having my improved pigments incorporated therein have improved brushing quality and better suspension as compared with prior art luminescent zinc sulfides.

Its usefulness is further enhanced by the novel effect of my process on the ease of dispersion of the product. This makes possible its incorporation in paint vehicles, etc., without the grinding step which was necessary in the prior art. Furthermore, since the grinding step is eliminated there is no sacrifice in the luminosity of such products. One of the main reasons why said product possesses good pigment properties is because of the fact that the zinc compound is precipitated under acidic conditions. This is evidenced by reference to the table wherein the sample prepared under non-acidic conditions had a marked tendency to form lumps.

A further advantage of my process over the prior art is realized from the fact that the zinc compound may be precipitated in the presence of the copper compound as well as in the presence of my disclosed salts. Because of this, these agents are well dispersed in the pigment before calcination and therefore act more efficiently than otherwise.

Due to the unique effect of my process, namely the production of fine particle size, the tinting strength of the new product is relatively high. This renders it useful as a pigment whereas the coarser products have practically no value as prime pigments.

As many apparently widely different embodiments of this invention may be made without departing from the spirit and scope thereof, it is to be understood that I do not limit myself to the specific embodiment except as defined in the appended claims.

Having described the present invention the following is claimed as new and useful:

1. A process for producing a luminescent zinc compound suitable for pigment use which comprises taking an acidic solution containing between about $\frac{1}{10}$ of a mol and about 1 mol of zinc per liter and containing about 1 part, calculated as copper, of copper chloride for about every 5,000 to about every 50,000 parts of zinc and precipitating zinc sulfide therefrom with hydrogen sulfide, filtering and washing the precipitated zinc sulfide and substantially neutralizing the remaining acid with ammonium hydroxide, adding between about .06% and about 5%, calculated as chlorine and based upon the zinc sulfide, of ammonium chloride, and thereafter calcining at a temperature between about 1,000° C. and about 1,100° C.

2. A process for producing a luminescent zinc compound suitable for pigment use which comprises taking an acidic solution containing between about $\frac{1}{10}$ of a mol and about 1 mol of zinc per liter and containing about 1 part, calculated as copper, of a soluble salt of copper, for about every 5,000 to about every 50,000 parts of zinc and precipitating zinc sulfide therefrom with hydrogen sulfide, filtering and washing the precipitated zinc sulfide and calcining at a temperature between about 800° C. and about 1,200° C., said calcination being carried out in the presence of between about 0.06% and about 5%, calculated as chlorine and based on the zinc sulfide, of a member selected from the group consisting of ammonium chloride and zinc chloride.

3. A process for producing a luminescent zinc compound suitable for pigment use which comprises taking an acidic solution containing between about $\frac{1}{10}$ of a mol and about 1 mol of zinc per liter and containing about 1 part, calculated as copper, of a soluble salt of copper, for about every 5,000 to about every 50,000 parts of zinc and precipitating zinc sulfide therefrom with hydrogen sulfide, filtering and washing the precipitated zinc sulfide and adding to it between about 0.06% and about 5%, calculated as chlorine and based on the zinc sulfide, of a member selected from the group consisting of ammonium chloride and zinc chloride, and thereafter calcining at a temperature between about 800° C. and about 1200° C.

4. A process for producing a luminescent zinc compound suitable for pigment use which comprises taking an acidic solution containing between about $\frac{1}{4}$ of a mol and about $\frac{1}{2}$ of a mol of zinc per liter and containing about 1 part, calculated as copper, of a soluble salt of copper, for about every 10,000 to about every 20,000 parts of zinc and precipitating zinc sulfide therefrom with hydrogen sulfide, filtering and washing the precipitated zinc sulfide and substantially neutralizing the remaining acid with ammonium hydroxide, adding between about 0.6% and about 2%, calculated as chlorine and based on the zinc sulfide, of a member selected from the group consisting of ammonium chloride and zinc chloride, and thereafter calcining at a temperature between about 800° C. and about 1,200° C.

5. A process for producing a luminescent zinc compound suitable for pigment use which comprises taking an acidic solution containing between about ¼ of a mol and about ½ of a mol of zinc per liter and containing about 1 part, calculated as copper, of copper chloride, for about every 10,000 to about every 20,000 parts of zinc and precipitating zinc sulfide therefrom with hydrogen sulfide, filtering and washing the precipitated zinc sulfide and substantially neutralizing the remaining acid with ammonium hydroxide, adding between about 0.6% and about 2%, calculated as chlorine and based on the zinc sulfide, of a member selected from the group consisting of ammonium chloride and zinc chloride, and thereafter calcining at a temperature between about 1,000° C. and about 1,100° C.

ANIELLO AUGUSTUS ROMANO.